United States Patent [19]
Todd, Sr.

[11] Patent Number: 4,793,096
[45] Date of Patent: Dec. 27, 1988

[54] PLANT GROWING AND HANDLING SYSTEM

[75] Inventor: George K. Todd, Sr., Ruskin, Fla.

[73] Assignee: Speedling Incorporated, Sun City, Fla.

[21] Appl. No.: 831,914

[22] Filed: Feb. 20, 1986

[51] Int. Cl.$^4$ .............................................. A01G 31/02
[52] U.S. Cl. ........................................ 47/59; 47/62; 47/64; 47/17
[58] Field of Search ..................... 47/17, 48.5, 59, 61, 47/62, 63, 64; 405/36, 51; 251/326; 137/606, 263; 406/88; 4/580, 493, 498, 652, DIG. 14

[56] References Cited

U.S. PATENT DOCUMENTS

| | | | |
|---|---|---|---|
| 3,773,065 | 11/1973 | Mattox | 137/263 |
| 3,824,736 | 7/1974 | Davis | 47/17 |
| 3,854,500 | 12/1974 | Cooper | 251/326 |
| 4,312,152 | 1/1982 | Drury et al. | 47/62 |
| 4,513,533 | 4/1985 | Gething et al. | 47/63 |
| 4,597,272 | 7/1986 | Max et al. | 47/17 |

FOREIGN PATENT DOCUMENTS

| | | | |
|---|---|---|---|
| 244243 | 5/1984 | Japan | 47/65 |
| 2101863 | 1/1983 | United Kingdom | 47/59 |

*Primary Examiner*—Robert A. Hafer
*Assistant Examiner*—Kevin G. Rooney
*Attorney, Agent, or Firm*—Mason, Fenwick & Lawrence

[57] ABSTRACT

A plant flat handling system for handling floatable plant flats employs a horizontally extending main channel which can be flooded from either a water tank or a nutrient containing tank with a plurality of branch channels extending outwardly from the main channel. Gate valve means between the branch channel and the main channel can be opened to permit the main channel to fill the branch channel or to drain the branch channel when the main channel is drained. Plural wires extend along the length of the branch channels and support floating plant flats when the branch channels are drained. Periodic flooding and draining of the branch channels is effected until plants in the flats have matured and can be harvested. Harvesting is effected by maintaining light pressure against the outermost plant flats in the branch channel to urge the body of plant flats toward a main work area overlying the main channel. A power conveyor extends downwardly into the branch channel and lifts the flats therefrom for harvesting. A reverse procedure is employed when plant flats are to be deposited in a flooded branch channel with the power conveyor lowering the flats into the channel so that newly added flats push previously positioned flats outwardly along the length of the channel until the channel has been covered with flats.

19 Claims, 8 Drawing Sheets

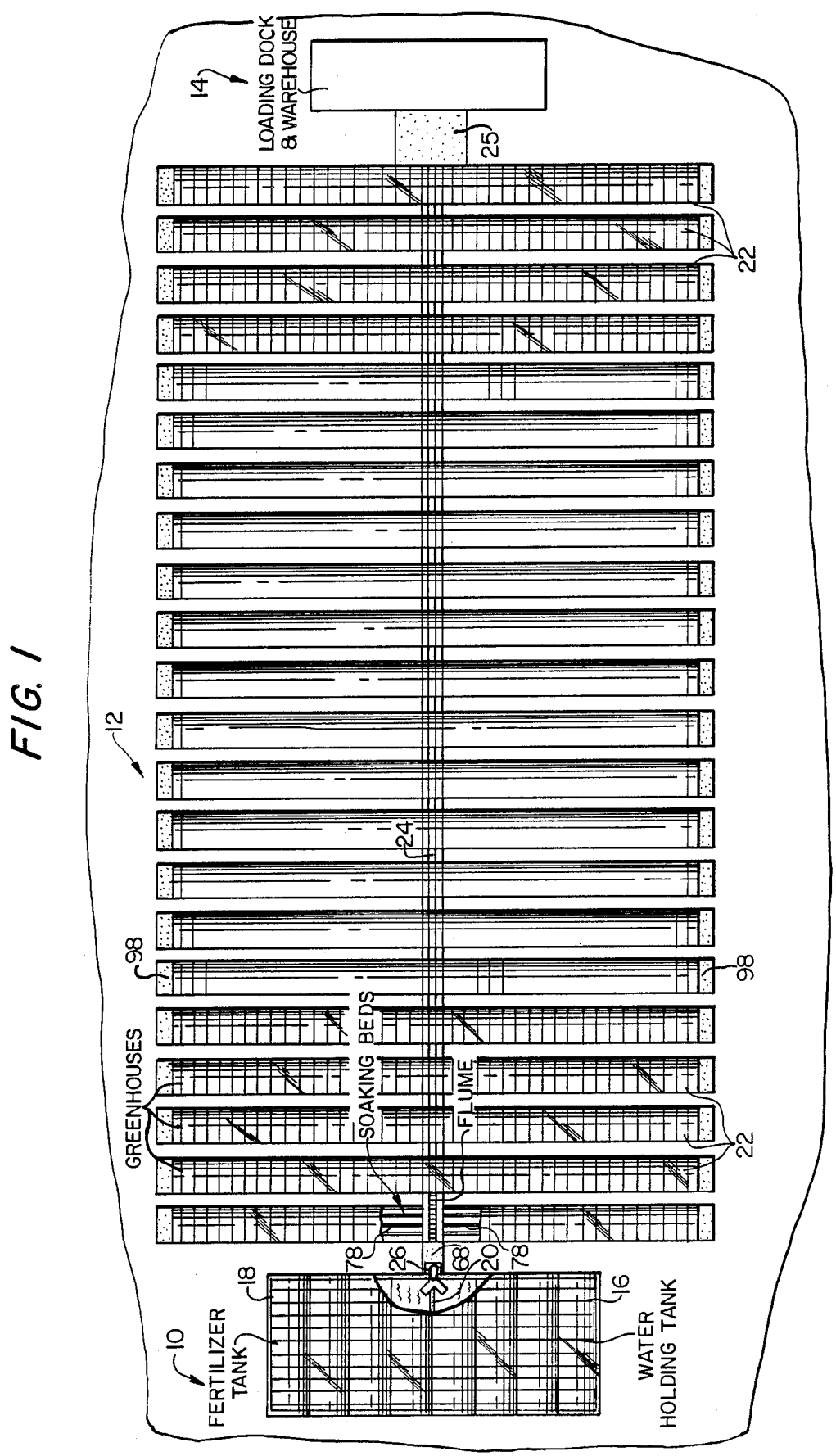

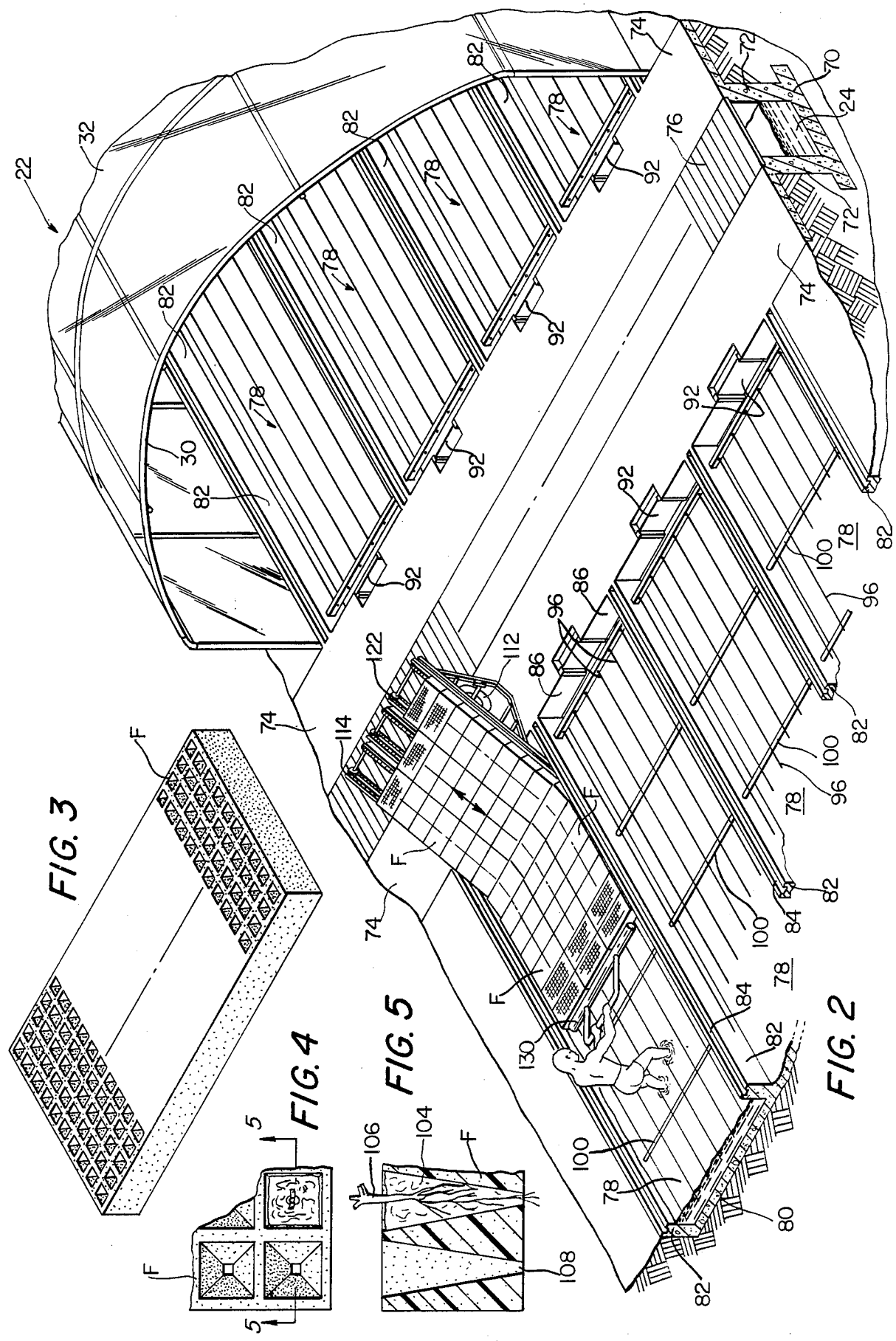

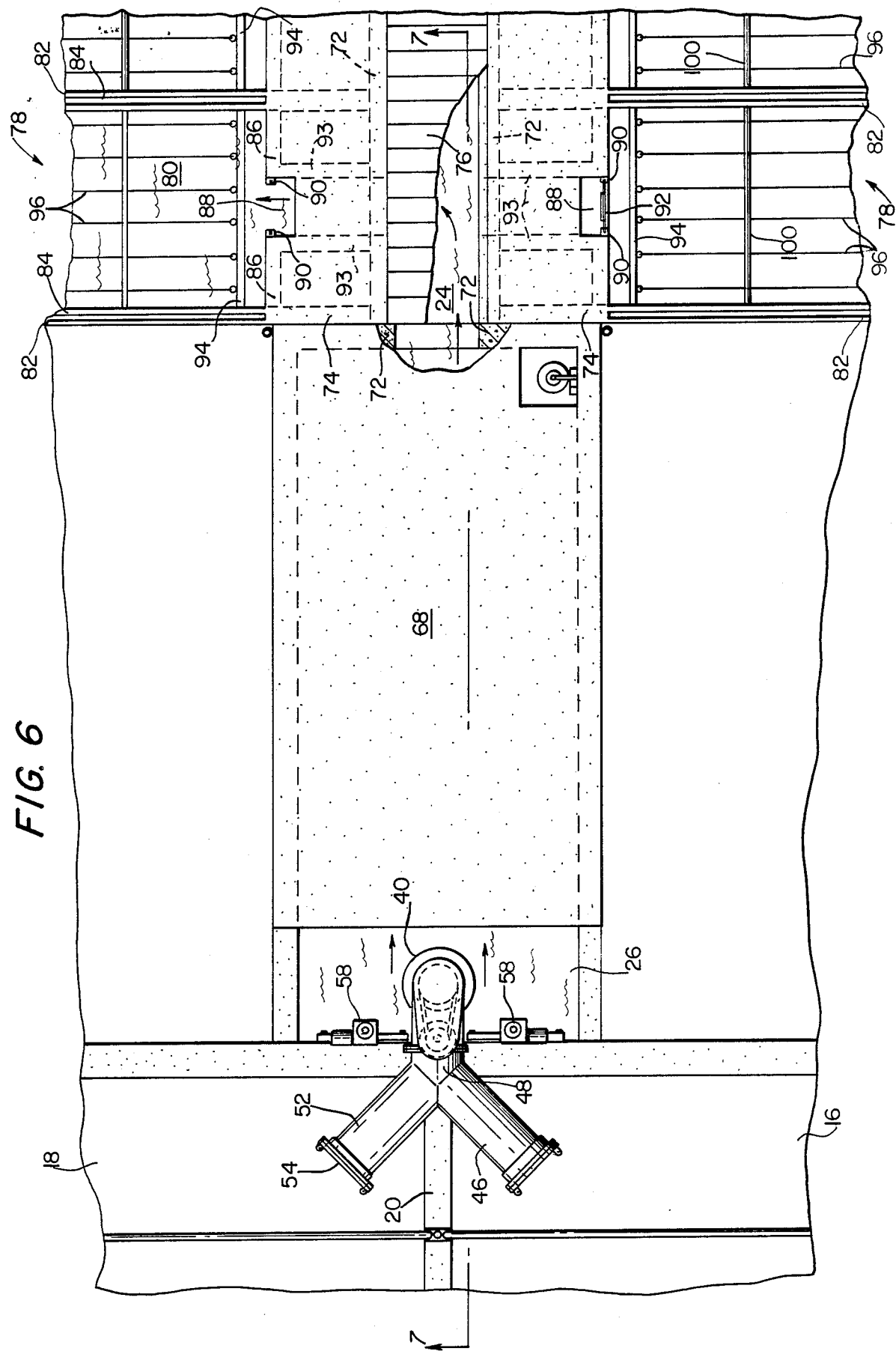

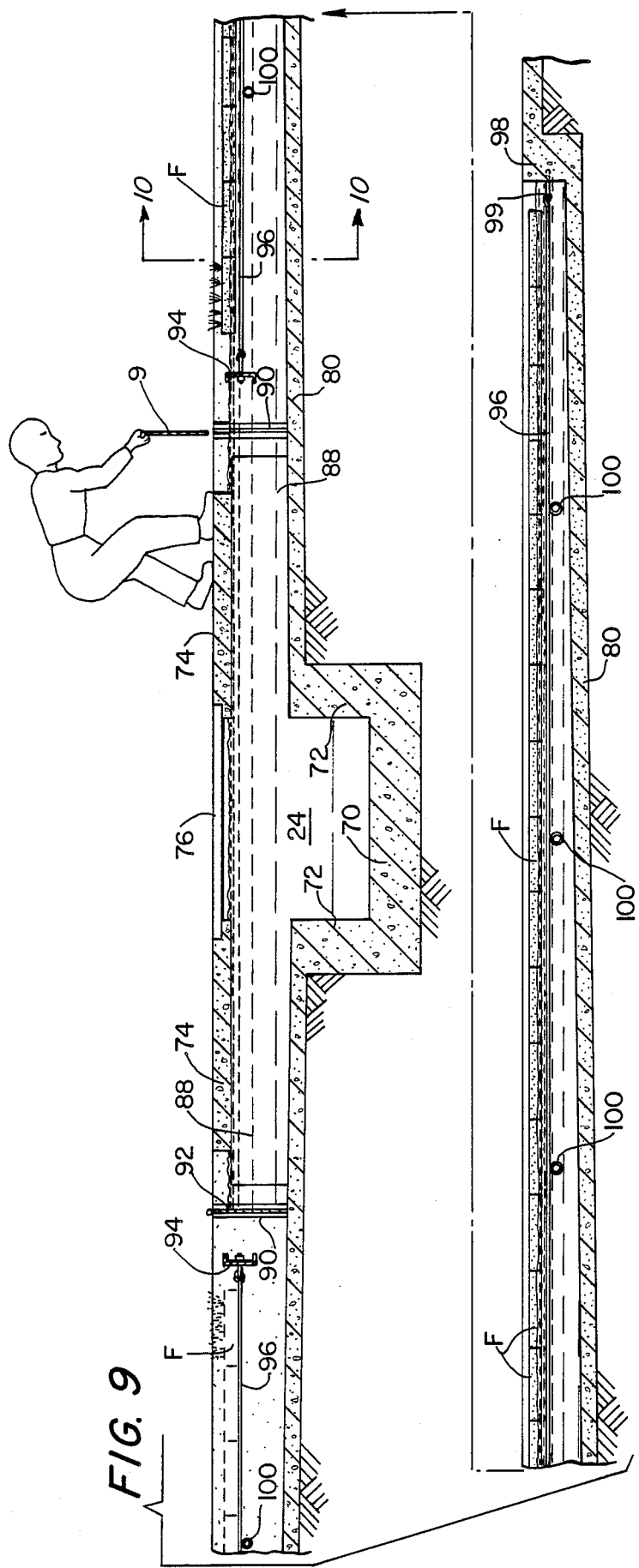
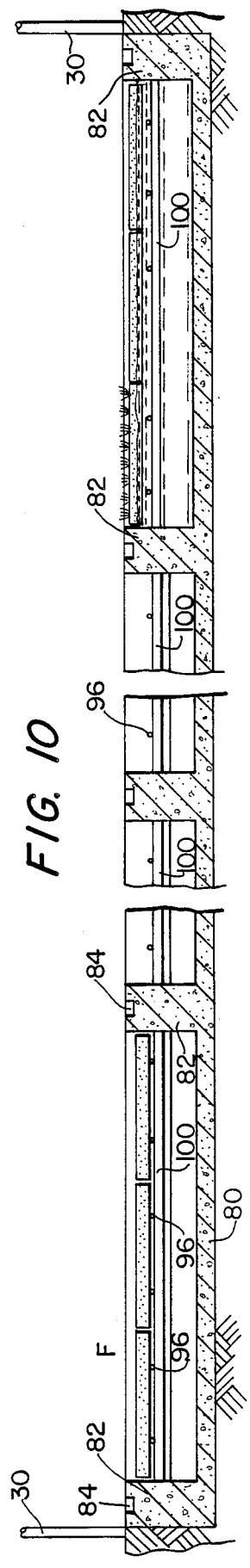
FIG. 9
FIG. 10

PLANT GROWING AND HANDLING SYSTEM

BACKGROUND OF THE INVENTION

The present invention is in the field of plant growing systems and is specifically directed to the field of seedling growing, particularly greenhouse growing such as the growing of tomato seedlings and the like.

Earlier U.S. Pat. No. 3,667,159 discloses a seedling flat formed of foamed plastic as shown in FIGS. 1 and 2 of said patent in which planting cells 32 are provided with lower openings 34 and are tapered downwardly so that the seedlings can be easily removed. Seedlings have been grown in such flats with watering being effected by overhead spray means, a procedure that is wasteful of water and inducive of disease in the plants. The present invention is directed to a unique system for handling flats of the aforementioned type and for providing nutrients to seedlings in such flats by the floatation of the flats on nutrient containing liquid so that the nutrient containing liquid flows upwardly into the planting cells through the lower openings 34.

It has been previously proposed to provide seedling plants in a support from which the plant roots downwardly extend into a floodable trough or the like which is periodically flooded to provide water and/or nutrients to the roots. Examples of such devices are found in U.S. Pat. Nos. 3,451,162; 3,925,926; 4,324,069 and 4,327,538. U.S. Pat. No. 4,486,977 also discloses similar concepts.

It has additionally been proposed to provide floating plant flats or the like which float on a body of liquid providing nutrients for plants in the flat as shown in U.S. Pat. Nos. 2,175,113; 2,531,562; 3,927,491; 4,028,847; 4,034,506; 4,037,360; 4,312,152; 4,468,885; and 4,513,533. Additionally, British Pat. Nos. 1,031,309; 1,038,320; 1,053,508; and 1,313,121 also disclose similar floating plant flat systems.

It has also been proposed to provide a trough including wire means for supporting a plant container such as in U.S. Pat. No. 4,075,785. Similarly, Austrian Pat. No. 241,896 appears to disclose the use of wire supports for plant flats. Other prior art devices of interest include U.S. Pat. Nos. 4,004,369 and 4,166,341.

SUMMARY OF THE INVENTION

It is the primary object of the present invention to provide a unique and improved plant handling system and method.

Achievement of the foregoing object is enabled by the preferred embodiment of the invention which comprises a storage tank or reservoir in which liquid containing nutrients is maintained. Valve means in the lower portion of the storage tank or reservoir communicates with a sump which in turn communicates with a generally horizontally extending main channel in the nature of a flume formed of concrete and having an open-topped or closed rectangular fluid conduit extending along its length. A plurality of parallel branch channels extend outwardly from opposite sides of the main channel and communicate therewith through selectively operable gate valve members so that liquid in the main channel can flow into the branch channel if the gate valve means is opened. Each branch channel is provided with a plurality of parallel wires extending along its length and supported intermittently by transverse beams extending across the width of each branch channel. A plurality of floatable plant flats of the type disclosed in U.S. Pat. No. 3,667,159 are provided in each branch channel and are arranged in lengthwise extending and transversely extending rows with respect to each branch channel.

Pump means are provided for pumping liquid from the sump back into the storage tank or reservoir to consequently drain the main channel and any branch channels in which the gate valve means has been opened. When the branch channels are drained in the aforementioned manner, the plant flats therein are supported by the parallel support wires extending the length of each respective branch channel.

The space over the main channel is provided with a wooden decking extending along its length. Additionally, first and second concrete slabs run along the length of each side of the main channel and cooperate with the wooden decking to define a work area extending adjacent the inner ends of each of the branch channels. The center area of the greenhouse, over the main channel, is of reinforced concrete with manholes periodically to clean and service the main water channel.

Plant flats are loaded into and taken from the branch channels by the use of a unique portable elevator arrangement positionable in the work area to extend downwardly into a selected branch channel for receiving plant flats from, or dispatching plant flats to the respective branch channel. Pusher means engageable with the outermost transverse row of floating plant flats acts to move the innermost transverse row of flats onto the elevator conveyor means with such movement being easily effected with the branch channel being in a flooded condition so that the flats float on the liquid therein.

A better understanding of the preferred embodiment of the invention will be achieved when the following detailed description is considered in conjunction with the appended drawings in which like reference numberals are used for the same parts as illustrated in the different figures.

BRIEF DESCRIPTION OF THE DRAWING

FIG. 1 is a plan view of the preferred embodiment for practice for the invention;

FIG. 2 is a perspective view of a portion of the preferred embodiment as viewed from above;

FIG. 3 is a perspective view of a plant flat of the type employed in the preferred embodiment;

FIG. 4 is an enlarged top view of a portion of the plant flat of FIG. 3;

FIG. 5 is a sectional view taken along lines 5—5 of FIG. 4;

FIG. 6 is a plan view of liquid supply and control means employed in the preferred embodiment;

FIG. 9 is a sectional view taken along lines 9—9 of FIG. 7;

FIG. 10 is a sectional view taken along lines 10—10 of FIG. 9;

DESCRIPTION OF THE PREFERRED EMBODIMENT

Figure 7:
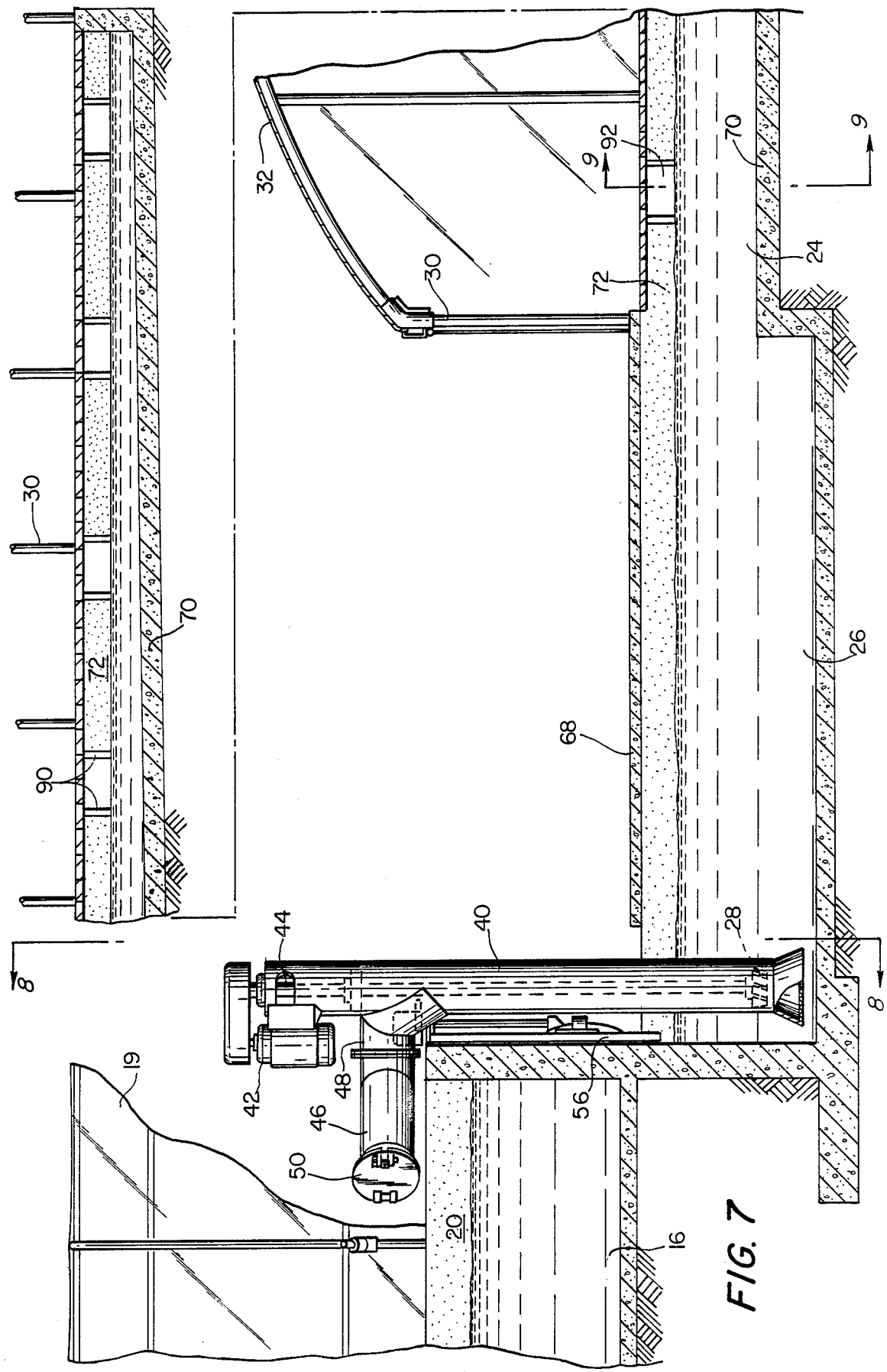
FIG. 7 is a sectional view taken along lines 7—7 of FIG. 6.
Figure 8:
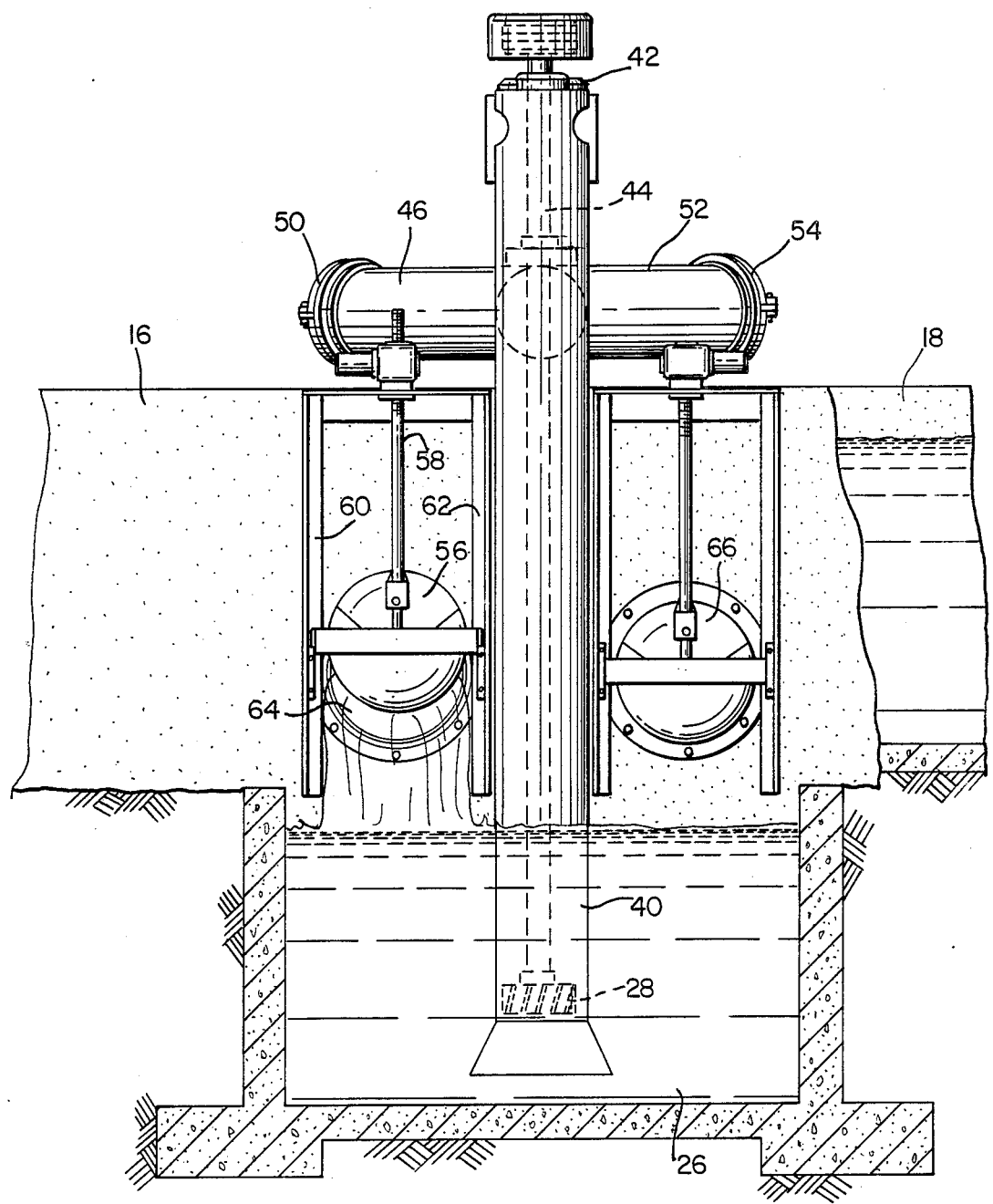
FIG. 8 is a sectional view taken along lines 8—8 of FIG. 7.

Attention is initially invited to FIG. 1 of the drawings which illustrates the entire system and which consists of three main areas comprising a liquid storage and dispensing area 10, a greenhouse area 12 and a loading dock and plant handling area 14. The liquid storage area 10 includes a water holding tank 16 in which water is stored and a nutrient holding tank 18 in which water containing nutrients is stored. A metal frame supported plastic cover 19 extends over tanks 16 and 18.

Water tank 16 is separated from nutrient tank 18 by a wall 20. A plurality of greenhouses 22 extend parallel to each other transversely over a main channel 24 which extends to a slab 25 in the plant handling area 14 on one end and which communicates on its opposite end with a sump 26 as shown in FIG. 7.

Greenhouses 22 are of conventional construction employing metal frame means 30 and plastic top and side covering material 32 which can be rolled-up and opened to permit air circulation as required.

A vertical standpipe 40 has its lower end in sump 26 and encloses a pump 28 with the upper end of the standpipe supporting electric motor 42 for driving pump 28 by means of shaft 44 in an obvious manner. A water discharge conduit 46 has its inner end connected to the upper end of standpipe 40 by a short discharge conduit 48 extending outwardly thereform as best shown in FIG. 6. The inner end of the water discharge conduit 46 is provided with a rugged blocking cap 50 attached thereto for hinged movement between open and closed positions. Similarly, a liquid nutrient discharge conduit 52 has its inner end connected to the main discharge conduit 48 and has a blocking cap 54 identical to cap 50 attached to its outer end.

Discharge of water from the water tank 16 into sump 26 is enabled by a vertically movable valve gate 56 which is raised or lowered by threaded rod 58 gate valve 56 is restricted to vertical movement by side guides 60 and 62. In its lowermost position, gate valve 56 completely blocks a discharge opening 64 provided in the wall of water tank 16. Similarly, a gate valve 66 is provided in a wall of the nutrient tank 18 for permitting the discharge of liquid nutrient therefrom. The construction and operation of gate valve 66 is identical to that of gate valve 56. A concrete slab cover 68 extends over the sump 26 as best shown in FIGS. 6 and 7.

Main channel 24 is formed of a floor slab 70 and a pair of vertical side walk 72 as best illustrated in FIG. 2. Additionally, side wall slabs 74 extend outwardly in horizontal manner from the upper edges of the side walls 72. Thus, it will be seen that the members 70 and 72 cooperate to define an open-topped channel which is covered by boards 76 having their ends supported on lengthwise extending edge recesses in the upper edges of side walls 72 as shown in FIGS. 2 and 9. The upper surfaces of boards or reinforced concrete cover 76 and sidewalks 74 are coplanar and cooperate to define a relatively wide work area in which equipment and personnel can operate.

Each greenhouse 22 covers one to four branch channels 78 each extending outwardly perpendicularly and transversely to the main channel 24. The branch channels 78 are formed by a floor slab 80 and two to five parallel vertical walls 82. It should be observed that the vertical walls 82 are each provided with an upper groove 84 of sufficient depth to receive wheels of a spray or work carriage or the like (not shown) which can be moved along the length of each of the branch channels if desired. The inner extent of each branch channel 78 is defined by first and second inner vertical end walls 86 coextensive with the outer edges of sidewalks 74 and extending upwardly from floor slab 80 and separated by the outer end of a connector conduit 88 as shown in FIG. 6. Vertically extending valve plate guides 90 comprising extruded metal members having vertical slots are positioned on the inner ends of the vertical end walls 86. Each connector conduit 88 is additionally defined by vertical walls 93 and a bottom slab 95 extending between the inner vertical end walls 86 and the side walls 72 of the main channel 24. A valve gate in the form of a metal plate 92 can be positioned in the valve plate guides 90 to prevent fluid flow between the branch channels 78 and main channel 24 in an obvious manner. An alternative method of controlling fluid flow between the branch channels 78 and the main channel 24 is an electrically operated laterally moving, gate.

Each branch channel 78 additionally includes an inner transversely extending wire anchor channel 94 (FIG. 12) to which six taut plant flat support wires 96 are connected with the outer ends of wires 96 being connected to an outer end wall 98 of the branch channels by means of an eyebolt 99 or the like embedded therein as best shown in FIG. 9. Additionally, equidistantly spaced transversely extending wire support pipes 100 are mounted in the walls 82 and extend beneath the wires 96 to support the wires in substantially horizontal parallel alignment with each other.

It should be observed that the slab 80 defining the bottom of the branch channel 78 slopes downwardly slightly from the outer end adjacent end wall 98 toward its juncture with the side walls 72 of the main channel 24 as shown in FIG. 9.

Plant flats F are formed of expandable polystyrene foam or the like and are essentially identical to the foam flats shown in U.S. Pat. No. 3,667,159. The flats are quite buoyant and easily float even when filled with planting media 104 and seedling plants 106. It should be observed that the bottom of each planting cell is open as shown at 108.

Figure 12:
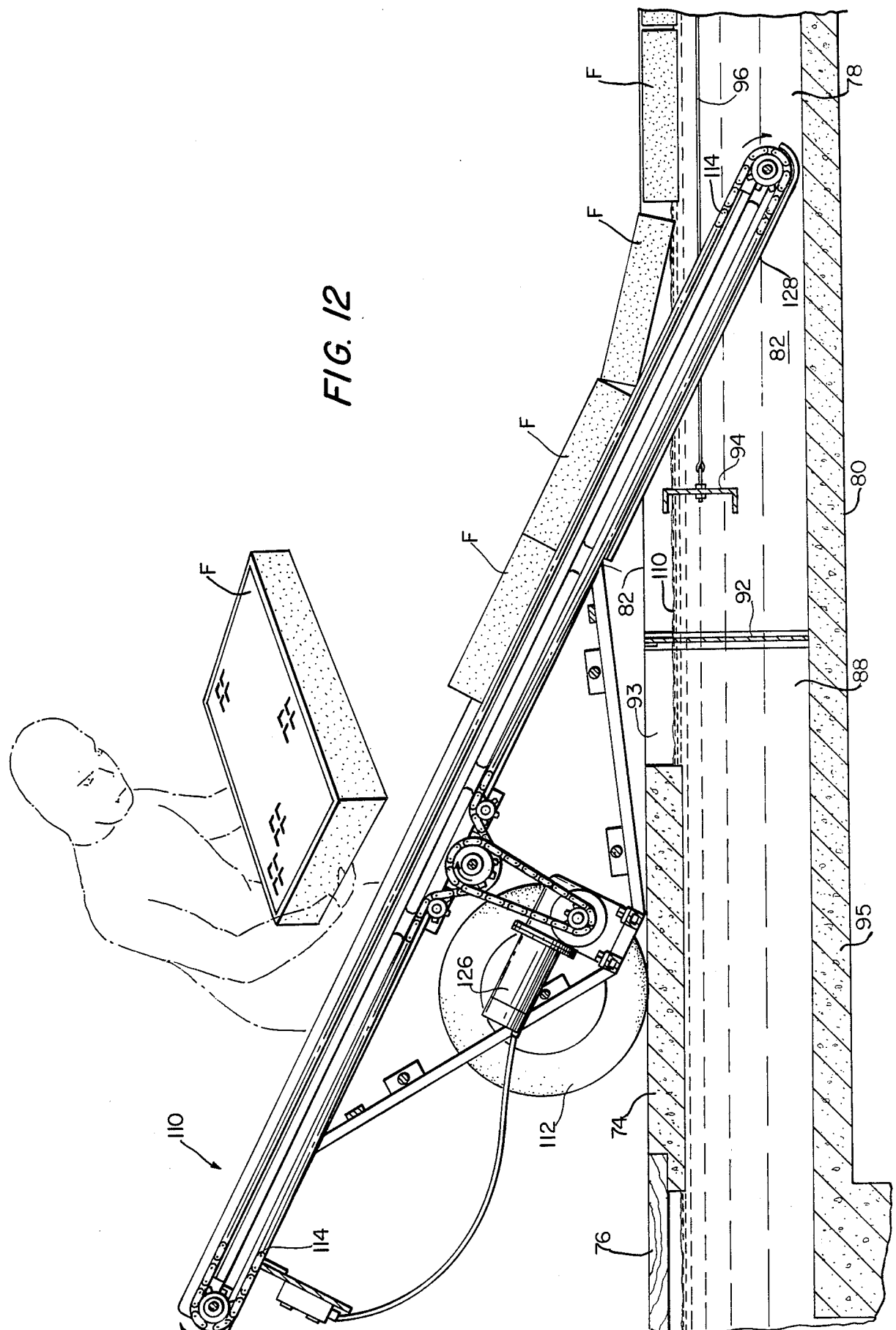
FIG. 12 is a sectional view taken along lines 12—12 of FIG. 11.

When a branch channel 78 is flooded with water or water including liquid nutrients so as to have an upper surface 110 as shown in FIG. 12, the flats F float above the support wires 96 as shown. However, when a branch channel 78 is drained of liquid, the plant flats F rest on wires 96 as shown in the upper left portion of FIG. 9.

Use of the system is effected by initially opening one or the other of valve gates 56 or 66 to flood the main channel 24 and any of the adjacent branch channels 78 from which the valve gate 92 has been removed as shown in the upper right portion of FIG. 9. Those branch channels 78 from which the valve gate has not been removed will remain dry as shown in the upper left portion of FIG. 9. Consequently, any flats resting on the wires 96 in a flooded branch channel will float on the liquid and liquid can flow upwardly into the plant cells of each flat F through the lower opening 108 in an obvious manner. The flats will be permitted to remain floating in this manner for a sufficient time period to permit the planting media 104 to become sufficiently moist; this procedure prevents over-watering due to the limited amount of flow that can occur as a consequence of capillary action. Main channel 24 will than be drained by operation of pump 28 which will return the liquid to the proper tank 16 or 18 depending upon the nature of the liquid; one or the other of blocking caps 50, 54 will be in its closed blocking position during the operation of pump 28. It should be noted that the floor slab 70 slopes downwardly by a slight amount from its outer end adjacent the loading dock slab 25 to its juncture with sump 26. Consequently, the main channel 24 can be easily drained along with its adjacent branch channels. The flats will be permitted to remain suspended on the wires 96 for a predetermined time period depending upon the nature of the particular plants in the flats. The cycle will be repeated at desired intervals until the plants are ready for harvesting.

Figure 11:
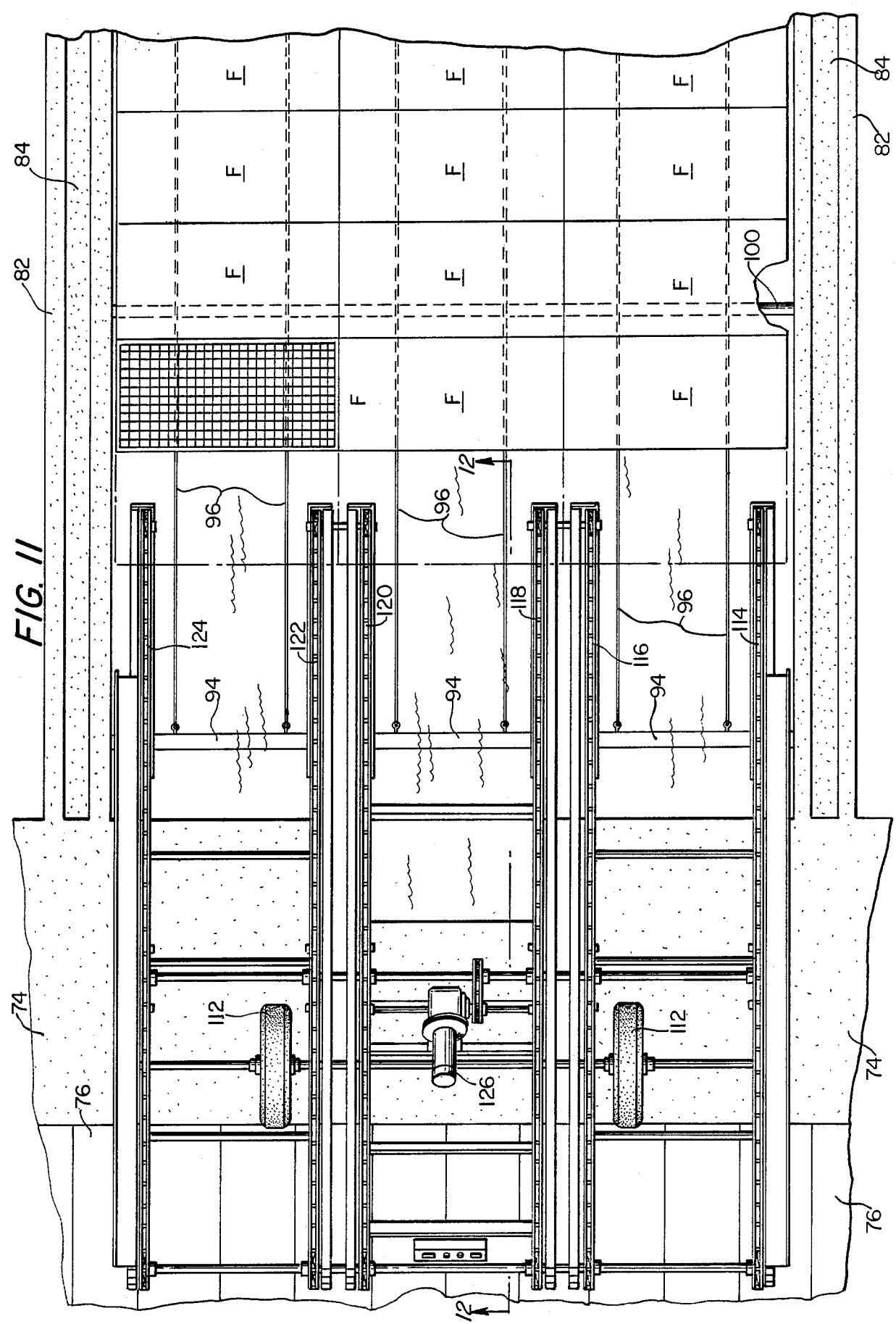
FIG. 11 is a top plan view of elevator conveyor means employed in the preferred embodiment.

Positioning of the flats F in the branch channels 78 is initially accomplished by first flooding the desired branch channels and using a portable elevator conveyor 110 which is best illustrated in FIG. 12. The portable elevator conveyor 110 includes wheels 112 which support a metal framework on which conveyor chains 114, 116, 118, 120, 122 and 124 are mounted. Chains 114 etc are driven by reversible electric motor means 126 as shown in FIG. 12. The forward ends of the chains 114 etc are provided with guard members 128 on their lower and forward ends and are positionable in the branch channels 78 as shown in FIGS. 11 and 12. When the chains 114 etc. are driven in the direction illustrated in FIG. 12 the portable elevator conveyor 110 serves to deposit flats F in the branch channel 78 in an obvious manner. The flats are deposited serially and each flat pushes previously deposited flats outwardly away from the work area. A floating pusher 130 maintains the first row of flats in alignment. Operation of the conveyor chains 114 in an opposite direction can be employed to remove plant flats from the channel with the flats being pushed onto the elevator conveyor by the hand held pusher 130 as shown in FIG. 2. Operators of the system place flats on, or remove flats from, the portable elevator conveyor in accordance with the function being performed.

Alternatively, pusher 130 could simply by a floating pipe or the like having cords connected adjacent its outer ends with the cords being operated from the work area and pulled toward the work area to urge the floating flats onto the submerged end of the elevator means 110 or to keep the outer row of flats in proper position. An important feature of the success of the operation is the fact that the plant flats are dimensioned so that they can be aligned in transverse rows consisting of three plant flats having their longest dimension substantially transverse to the length axis of the branch channels 78 as shown in FIG. 2. Also, the flats are arranged in three rows extending along the length of the branch channels as shown in FIG. 2.

Thus, the inventive system totally avoid the need for overhead spraying or the like which can result in the spread of disease and the loss of substantial quantities of liquid through evaporation. Moreover, the inventive system greatly reduces labor costs involved in the handling of the plant flats as compared to prior known systems. While numerous modifications of the disclosed embodiment will undoubtedly occur to those of skill in the art, it should be understood that the spirit and scope of the invention is to be limited solely by the appended claims.

I claim:

1. A plant flat handling system comprising:
    (a) an elongated horizontally extending main channel for receiving a quantity of liquid;
    (b) liquid control means for selectively withdrawing liquid from said main channel for substantially filling said main channel with liquid;
    (c) a plurality of elongated branch channels each having a length axis branching outwardly from said main channel for receiving liquid from, said main channel so as to be filled with liquid, or for discharging liquid into, said main channel so as to achieve a substantially drained condition;
    (d) selectively operable valve means provided between each of said branch channels and said main channel for permitting or preventing liquid flow between said main channel and each of said branch channels;
    (e) vertically fixedly positioned plant flat support means extending lengthwise of said branch channels;
    (f) a plurality of floatable plant flats extending in said branch channels and arranged in at least two rows respectively extending transversely to and parallel to the length axis of each branch channel; and
    (g) wherein said floatable plant flats are supported above the bottoms of their respective branch channel by said plant flat support means when the respective branch channel is drained of liquid but float above said plant flat support means in spaced relation thereto when the respective branch channel is substantially filled with liquid.

2. The plant flat handling system of claim 1 wherein said liquid control means includes;
    (a) tank means having valve means which when opened discharges liquid into sump means communicating with said main channel so as to fill said main channel with liquid; and
    (b) pump means for withdrawing liquid from said sump means and discharging it into said tank means to effect draining of said main channel.

3. The plant flat handling system of claim 1 wherein said liquid control means includes:
    (a) first and second tank means having valve means which when selectively opened discharge liquid into sump means communicating with said main channel so as to fill said main channel with liquid and
    (b) pump and valve means for withdrawing liquid from said sump means and selectively discharging it into one of said tank means to effect draining of said main channel.

4. The plant flat handling system of claim 1 wherein said liquid control means includes:
    (a) first and second tank means each having valve means which when selectively opened discharge liquid into sump means communicating with said main channel so as to fill said main channel with liquid;
    (b) pump and valve means for withdrawing liquid from said sump means and selectively discharging it into one of said tank means to effect draining of said main channel; and
    (c) wherein said plant flat support means comprises a plurality of wires extending lengthwise of each of said branch channels and positioned below and spaced from the bottoms of plant flats floating on liquid in said branch channel but above the bottom of the branch channel.

5. The plant flat handling system of claim 1 wherein said liquid control means includes:
   (a) first and second tank means each having valve means which when selectively opened discharge liquid into sump means communicating with said main channel so as to fill said main channel with liquid;
   (b) pump and valve means for withdrawing liquid from said pump means and selectively discharging it into one of said tank means to effect draining of said main channel;
   (c) wherein said plant flat support means comprises a plurality of wires extending lengthwise of each of said branch channels and positioned below and spaced from the bottoms of plant flats floating on liquid in said branch channel but above the bottom of the branch channel; and
   (d) wherein said main channel is formed of a floor slab and first and second generally vertical side walls.

6. The plant flat handling system of claim 1 wherein said liquid control means includes:
   (a) first and second tank means each having valve means which when selectively opened discharge liquid into sump means communicating with said main channel so as to fill said main channel with liquid;
   (b) pump and valve means for withdrawing liquid from said pump means and selectively discharging it into one of said tank means to effect draining of said main channel;
   (c) wherein said plant flat support means comprises a plurality of wires extending lengthwise of each of said branch channels and positioned below and spaced from the bottoms of plant flats floating on liquid in said branch channel but above the bottom of the branch channel;
   (d) wherein said main channel is formed of a floor slab and first and second generally vertical side walls; and
   (e) wherein said branch channels are formed of a floor slab and a plurality of vertical side walls oriented perpendicular to the longitudinal axis of said main channel.

7. The plant flat handling system of claim 1 wherein said liquid control means includes:
   (a) first and second tank means each having valve means which when opened discharges liquid into sump means communicating with said main channel so as to fill said main channel with liquid;
   (b) pump and valve means for withdrawing liquid from said pump means and selectively discharging it into one of said tank means to effect draining of said main channel;
   (c) wherein said plant flat support means comprises a plurality of wires extending lengthwise of each of said branch channels and positioned below and spaced from the bottoms of plant flats floating on liquid in said branch channel but above the bottom of the branch channel;
   (d) wherein said main channel is formed of a floor slab and first and second generally vertical side walls;
   (e) wherein said branch channel are formed of a floor slab a plurality of vertical side walls oriented perpendicular to the longitudinal axis of said main channel; and
   (f) additionally including first and second parallel sidewalks extending outwardly from said side walls forming said main channel and having parallel outer edges defining the inner end of each of said branch channels.

8. The plant handling system of claim 7 additionally including removable decking means bridging the space between the upper edges of the side walls forming part of the main channel; and wherein said removable decking means has an upper surface in substantial alignment with upper surfaces of said sidewalks so that said decking means and said sidewalks define a work area extending above and adjacent the length of said main channel.

9. The plant handling system of claim 8 wherein said selectively operable valving means comprises a removable plate-like gate member positionable in a blocking position in vertical guide means adjacent the outer edge of one of said sidewalks, and further including a connector conduit extending from said vertical guide means to said main conduit, said plate-like gate member blocking communication between said branch channel and said connector conduit when in said blocking position.

10. The plant handling system of claim 9 additionally including power operated portable plant flat elevator means selectively positionable adjacent the inner end of one of said branch channels for depositing plant flats therein or removing plant flats therefrom.

11. A plant flat handling system comprising:
   (a) an elongated horizontally extending main channel for receiving a quantity of liquid;
   (b) liquid control means for selectively withdrawing liquid from said main channel or substantially filling said main channel with liquid;
   (c) a plurality of elongated branch channels communicating at an inner end with said main channel for receiving liquid from said main channel so as to be substantially filled with liquid, or for discharging liquid into, said main channel so as to achieve a substantially drained condition;
   (d) selectively operable valving means provided between each of said branch channels and said main channel for either permitting or preventing liquid flow between said main channel and each of said branch channels;
   (e) substantially immovable plant flat support means provided in said branch channels;
   (f) a plurality of floatable plant flats in said branch channels above said plant flat support means;
   (g) wherein said floatable plant flats when in a branch channel are supported above the bottoms of their respective branch channels by said plant flat support means when the respective branch channel is drained of liquid but float above and spaced from said plant flat support means when the respective branch channel is substantially filled with liquid above a given level; and
   (h) a work area extending over the length of said main channel and extending immediately adjacent the inner ends of said branch channels for permitting the deposit of plant flats in or the removal of plant flats from, said branch channels.

12. A plant handling system as recited in claim 11 additionally including wheel-mounted portable power driven plant flat elevator means on said work area movable to a position adjacent the inner end of any of said branch channels for either depositing plant flats in such branch channels or removing plant flats from such branch channel.

13. The plant flat handling system fo claim 12 wherein said liquid control means includes:
   (a) tank means having valve means which when selectively opened discharges liquid into sump means communicating with said main channel so as to fill said main channel with liquid; and
   (b) pump means for withdrawing liquid from said sump means and discharging it into said tank means to effect draining of said main channel.

14. The plant flat handling system of claim 12 wherein said liquid control means includes:
   (a) first and second tank means each having valve means which when selectively opened discharges liquid into sump means communicating with said main channel so as to fill said main channel with liquid and
   (b) pump means for withdrawing liquid from said sump means and selectively operable means for discharging said withdrawn liquid into one or the other of said tank means to effect draining of liquid from said main channel.

15. The plant flat handling system of claim 14 wherein said plant flat support means comprises a plurality of wires extending lengthwise of each of said branch channels and positioned below and spaced from the bottoms of plant flats floating on liquid in said branch channel but positioned above the bottom of the branch channel.

16. The plant flat handling system of claim 12 wherein said liquid control means includes.
   (a) a first tank containing water and a second tank containing water and nutrients with each tank having valve means which when opened discharges liquid into sump means communicating with said main channel so as to fill said main channel with liquid;
   (b) pump means for withdrawing liquid from said sump means and selectively operable conduit means for discharging said withdrawing liquid into one of said tank means to effect draining of said main channel;
   (c) wherein said plant flat support means comprises a plurality of wires extending lengthwise of each of said branch channels and positioned below and spaced from the bottoms of plant flats floating on liquid in said branch channel but also being spaced above the bottom of the branch channel.
   (d) wherein said main channel is formed of a floor slab and first and second generally vertical side walls.

17. The plant flat handling system of claim 16 wherein said branch channels are formed of a floor slab and a plurality of vertical side walls oriented perpendicular to the longitudinal axis of said main channel.

18. A plant flat handling system comprising:
   (a) an elongated horizontally extending work area having at least one side edge;
   (b) a plurality of elongated branch channels communicating at an inner end with said side end and being capable of being substantially filled with liquid;
   (c) selectively operable control means associated with each one of said branch channels for either filling said branch channel with liquid or draining said branch channel;
   (d) plant flat support means provided in each of said branch channels; and
   (e) a plurality of floatable plant flats positionable in said branch channels for vertical movement relative to said plant flat support means;
   (f) wherein said floatable plant flats when in a branch channel are supported above the bottoms of their respective branch channels by said plant flat support means when the respective branch channel is drained of liquid but float above and spaced from said plant flat support means when the respective branch channel is substantially filled with liquid whereby said branch channels can be filled with plant flats from said work area by serially inserting plant flats into a liquid filled branch channel and pushing previously inserted plant flats outwardly from the inner end of the branch channel.

19. A plant handling system as recited in claim 18 additionally including wheel-mounted portable power driven plant flat elevator means on said work area movable to a position adjacent the inner end of any of said liquid filled branch channels for either depositing plant flats in such branch channel or removing plant flats from such branch channel.

* * * * *